United States Patent [19]

Boles et al.

[11] 4,439,223
[45] Mar. 27, 1984

[54] PRODUCTION OF UREA-AMMONIUM NITRATE SUSPENSION FERTILIZER

[75] Inventors: Jeffrey L. Boles, Florence; Thomas M. Jones, Sheffield, both of Ala.

[73] Assignee: Tennessee Valley Authority, Muscle Shoals, Ala.

[21] Appl. No.: 485,785

[22] Filed: Apr. 18, 1983

Related U.S. Application Data

[63] Continuation of Ser. No. 448,568, Dec. 10, 1982.

[51] Int. Cl.³ .................................................. C05C 9/00
[52] U.S. Cl. .................................... 71/30; 71/59; 71/64.08
[58] Field of Search ........................ 71/28–30, 71/59, 64.08

[56] References Cited

U.S. PATENT DOCUMENTS

Re. 29,149 3/1977 Young .................................. 71/43 X

4,230,479 10/1980 Richardson ............................ 71/30

Primary Examiner—Ferris H. Lander
Attorney, Agent, or Firm—Robert A. Petrusek

[57] ABSTRACT

Highly concentrated nitrogen suspension fertilizers which have excellent long-term storage and handling properties in both warm and severely cold weather are produced from urea, ammonium nitrate, water, and attapulgite clay and contain urea crystals suspended in a saturated solution containing urea and ammonium nitrate. The compositions must be maintained within a very narrow range to produce satisfactory suspensions. Deviation from this narrow range results in poor quality, unusable products. For prevention of scale formation and production of small crystals, the products are cooled in two or more stages with gelling-type clay added prior to or during crystallization and with air cooling used in the cooling stage(s) involving crystallization.

7 Claims, 5 Drawing Figures

EFFECT OF COMPOSITION ON SALT-OUT TEMPERATURES OF UREA-AMMONIUM NITRATE SUSPENSIONS CONTAINING 1.5% CLAY

EFFECT OF COMPOSITION ON SALT-OUT TEMPERATURE OF 36-0-0, 1.5% CLAY GRADE UREA-AMMONIUM NITRATE SUSPENSIONS

FIG. 3

EFFECT OF COMPOSITION ON SALT-OUT TEMPERATURES OF 37-0-0, 1.5% CLAY GRADE UREA-AMMONIUM NITRATE SUSPENSIONS

FIG. 4

EFFECT OF COMPOSITION ON SALT-OUT TEMPERATURES OF 35-0-0, 1.5% CLAY GRADE UREA-AMMONIUM NITRATE SUSPENSIONS

FIG. 5

PRODUCTION OF UREA-AMMONIUM NITRATE SUSPENSION FERTILIZER

The invention herein described may be manufactured and used by or for the Government for governmental purposes without the payment to us of any royalty therefor.

This is a continuation of application Ser. No. 448,568, filed Dec. 10, 1982, for PRODUCTION OF UREA-AMMONIUM NITRATE SUSPENSION FERTILIZER.

INTRODUCTION

Our invention relates to novel highly concentrated nitrogen suspension fertilizer compositions produced from urea, ammonium nitrate, water, and attapulgite clay. The resulting products, to wit, urea-ammonium nitrate suspension fertilizers, are exceptionally high in grade, low in viscosity, contain small crystals which do not settle, and are capable of being shipped, stored, and handled at extremely low temperatures (0° F. and below). In addition, products resulting from following the teachings of our invention have excellent long-term storage characteristics and superior handling properties. More particularly, our invention relates to a narrow composition range which must be maintained to produce commercially usable urea-ammonium nitrate suspensions of exceptionally high concentration. Deviation from the narrow composition range results in poor-quality, unusable suspensions.

BACKGROUND OF THE INVENTION

1. Related Prior Art

The art of producing fluid fertilizers, both solutions and suspensions, is well known and fully described in the literature. See, for example, the following: U.S. Pat. No. 3,697,247, Jones et al, Oct. 10, 1972; U.S. Pat. No. 3,382,059, Getsinger, May 7, 1968; U.S. Pat. No. 3,192,013, Young, June 29, 1965; U.S. Pat. No. 3,813,233, Kendrick, May 28, 1974; U.S. Pat. No. 4,066,432, Jones, Jan. 3, 1978; U.S. Pat. No. 3,109,729, Slack et al, Nov. 5, 1963; U.S. Pat. No. 3,234,004, Smith et al, Feb. 8, 1966; Defensive Publications No. T940,014, Nichols et al, Nov. 4, 1975; No. T911,008, Getsinger, June 5, 1973; Canadian Pat. No. 811,080, Ramaradhya, Apr. 22, 1969; German Offen. No. 2,655,571, MacKinnon, June 20, 1977; British Pat. No. 1,301,005, Standard Oil Company, Dec. 29, 1972; No. 823,449, Brownlie, Nov. 11, 1959.

2. Field of the Invention

High-quality and highly concentrated fluid fertilizers of various types are now in wide use throughout the country because they display certain distinct advantages over dry mixes. The advantages of fluid fertilizers are lower shipping and handling costs, more simplified and even distribution to the soil, and the convenience of incorporation of pesticides, herbicides, and micronutrients in fluid fertilizers. Fluid fertilizers may be either solutions, slurries, or suspensions. Both slurries and suspensions contain crystals of fertilizer salts in saturated solutions. However, suspensions also contain small amounts of a suspending agent which keeps the liquid and solid phases homogeneously distributed. Slurry fertilizers generally have been replaced by suspensions because of the far superior storage and handling properties exhibited by suspensions, as will be discussed later. Suspension fertilizers which contain an abundance of small crystals of fertilizer salts suspended in saturated solutions can be of significantly higher concentration than solution fertilizers which contain no solids. Thus, suspension fertilizers have a distinct economic advantage over solution fertilizers in that the costs of handling, freight, storage, and application are cheaper per unit of plant nutrient. In addition, herbicides, pesticides, and micronutrients can be incorporated in suspensions in solid forms, regardless of their solubility therein, whereas in solution fertilizers, only soluble materials can be incorporated.

3. Description of the More Pertinent Prior Art

Ammonium polyphosphate suspension fertilizers are well known in the industry and have been produced as taught by Getsinger '059, Young '013, Jones et al '247, and Slack et al '729, supra. Because of the relatively high cost of polyphosphates, suspensions containing orthophosphate instead of polyphosphate were developed and prepared as taught by Kendrick '233 and Jones '432, supra.

Nitrogen solution fertilizers of various types are in wide use today. To provide an adequate supply of these types of fertilizers, the utilization of urea in combination with ammonium nitrate to form nitrogen solutions is widespread because higher nitrogen concentrations can be attained than by using solutions of either of these nitrogen sources separately. A common example of this practice is urea-ammonium nitrate solution (32 percent N) produced by mixing together about 35 parts of urea, 45 parts of ammonium nitrate, and 20 parts of water. This solution salts out at about 32° F.; increasing the water content lowers the salting-out temperature, but increases the cost of handling, shipping, storage, and application per unit weight of nitrogen.

Urea-ammonium nitrate suspensions have been produced, as in Nichols et al '014, supra, by dispersing attapulgite clay in water with a dispersing agent, tetrasodium pyrophosphate, and then mixing the dispersion with urea-ammonium nitrate solution (32 percent N) to yield a product with 30 percent N and 2 percent clay. However, this type of suspension does not contain crystals of urea or ammonium nitrate and is therefore of lower concentration than could be attained if these solids were present.

A urea-ammonium nitrate slurry containing urea solids in saturated urea-ammonium nitrate solution is taught in Brownlie '449, supra. This product was composed of two phases, the solid phase being urea and the liquid phase being a saturated urea-ammonium nitrate solution. In this slurry, the density of the liquid phase was equal to or greater than the density of the solid phase, so the solid phase floated in liquid phase rather than settling out as a sediment.

As determined in the work leading up to that comprising our invention, the urea-ammonium nitrate slurry as described by Brownlie has several undesirable characteristics which make the slurry unusable as a fluid fertilizer for most common applications: (1) Without gelling clay present in the slurry, the urea crystals rapidly grow to large sizes which prevents transfer of the material by pumping, because the long needlelike urea crystals mesh together and clogs pumps and pipelines. Also, such a product cannot be applied to the soil, because the large urea crystals clog spray nozzles used in fluid fertilizer application equipment. (2) Since the density of the liquid phase is equal to or greater than that of the solid phase and since no gelling clay is present in the slurry, the solids float in the liquid phase rather than being homogeneously distributed. Thus, the product contains a slurry layer and a clear liquid layer thereneath. To transfer the material by pumping, the product must be constantly agitated in order to keep the solid phase homogeneously distributed; otherwise, the clear liquid could be removed separately of the solid phase and prevent removal of the remaining solid phase, because the remaining solid phase does not contain enough liquid to impart fluidity to the solids. Also, if the product is allowed to stand unagitated for any length of time, the solid layer at the top of the mixture becomes hard and encrusted because the urea crystals grow and mesh together in a solid mass, and therefore, it becomes impossible to remove anything but the bottom clear liquid layer. Therefore, the product cannot be stored for any length of time without constant agitation. Even if stored with agitation, the urea crystals grow rapidly and render the product unusable as a fluid fertilizer. It is therefore clear that fluid fertilizers that contain solids which are not homogeneously distributed, whether it be floating or settling solids, are commercially unusable.

(3) The products described by Brownlie are unusable in most fluid fertilizer applications because, in addition to the above-described disadvantages, the compositions of the products are such that they cannot be stored, pumped, or applied to the soil at the low temperatures normally encountered during these operations in the fertilizer industry, i.e., 32° F., and below. It is common practice in the fertilizer industry to store liquid fertilizers through the winter and to begin blending operations and application of the fertilizers to the soil in late winter and early spring. Thus, fluid fertilizers must not only be capable of storage for long periods under adverse conditions without loss of quality, but must also remain fluid at low temperatures. The products described by Brownlie solidify at temperatures far above those which fluid fertilizers must often be stored and handled. Because of the excessive time required for thawing, solidification of fluid fertilizers during winter in large storage tanks prevents removal of the fertilizer at the time it is required for blending and/or application to the soil in spring.

SUMMARY OF THE INVENTION

Our invention relates to the production of highly concentrated nitrogen suspension fertilizers which have excellent long-term storage and handling properties in all types of weather. Our products are made from urea, ammonium nitrate, water, and attapulgite clay and contain urea crystals which remain homogeneously distributed in a saturated solution containing urea and ammonium nitrate. To produce these high-quality nitrogen suspensions, the product composition must be maintained within a very narrow range. Deviation from this narrow range results in poor quality and unusable products. To produce a suspension with small crystals and to prevent scale formation during cooling of the product, the products are cooled in two or more stages with gelling-type clay added prior to or during crystallization and with air cooling used in the cooling stage(s) involving crystallization.

OBJECTS OF THE INVENTION

It is therefore the principal object of the present invention to produce nitrogen suspension fertilizers of exceptionally high concentration and with excellent long-term storage and superior handling properties throughout the wide range of temperatures at which fluid fertilizers must be stored and handled.

A further object of the present invention is to produce highly concentrated nitrogen suspension fertilizers in which the solid phase and liquid phase remain homogeneously distributed and do not separate.

A still further object of the present invention is to produce highly concentrated nitrogen suspensions which contain small urea crystals that remain small and do not grow to large sizes during normal lengths of storage.

Another object of the present invention is to concisely and correctly identify the unexpectedly narrow composition range which is required for production of urea-ammonium nitrate suspensions with the characteristics described in the preceding objects.

A still further object of the present invention is to identify the process conditions required for production of urea-ammonium nitrate suspensions with the characteristics described in the preceding objects.

ADVANTAGES OF THE INVENTION

The principal advantages of the present invention are: (1) the products contain the highest possible nitrogen content that can be attained for satisfactory urea-ammonium nitrate suspensions; (2) the products have excellent long-term storage and superior handling properties throughout the wide range of temperatures at which fluid fertilizers must be stored and handled including extremely low temperatures, i.e., 0° F. and below; (3) the solid phase and liquid phase in these products remain homogeneously distributed and do not separate; (4) these products contain solids which are in the form of very small crystals which remain small and do not grow to large sizes during normal lengths of storage time; (5) these highly concentrated nitrogen suspensions can be produced by a simple and economical procedure using low-cost raw materials; (6) the products are of very high concentration so that shipping, handling, and storage costs are lower than similar products of lower concentration now in use; and (7) the products can be applied directly to the soil, or they can be combined with phosphate base suspensions and potassium chloride by a simple, economical cold-blending procedure to produce a wide variety of concentrated high-quality NPK suspensions.

Still further and more general objects and advantages of the present invention will appear from the more detailed description set forth below, it being understood, however, that this more detailed description is given by way of illustration and explanation only and not necessarily by way of limitation, since various changes therein may be made by those skilled in the art without departing from the true spirit and scope of the present invention.

DESCRIPTION OF THE INVENTION

The present invention, together with further objects and advantages thereof, will be better understood from a consideration of the following description taken in connection with the accompanying drawings in which.

Figure 1:
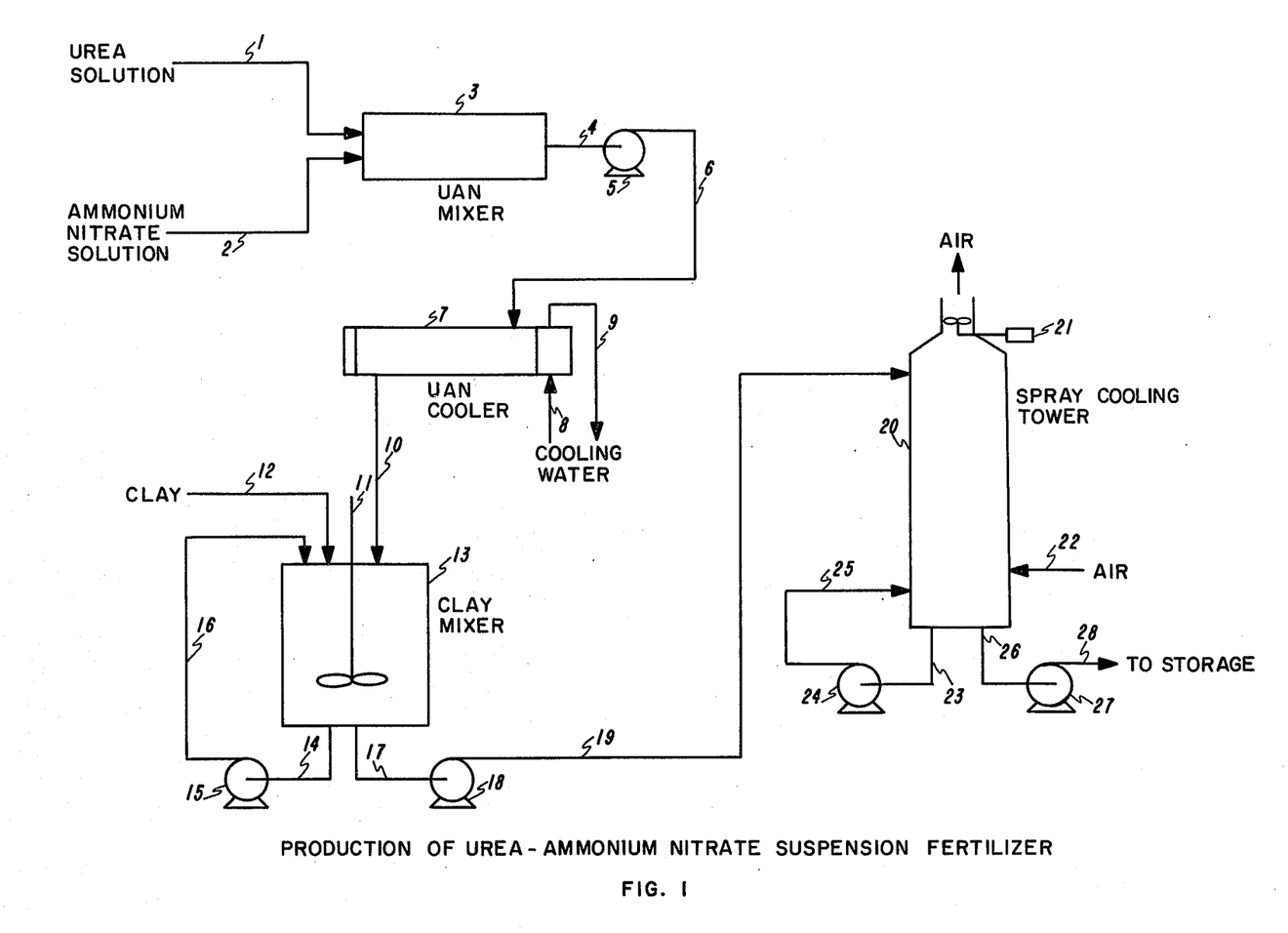
FIG. 1 is a flowsheet generally illustrating the principles of our novel continuous-type process.

Referring now more specifically to FIG. 1, urea solution from a source not shown is fed through pipeline 1 to UAN mixer 3. Ammonium nitrate solution is fed from a source not shown through pipeline 2 to UAN mixer 3. The resulting urea-ammonium nitrate solution from UAN mixer 3 flows through pipeline 4 to pump 5, which pumps UAN solution through pipeline 6 to UAN cooler 7. Cooling water is fed from a source not shown through pipeline 8 to UAN cooler 7 and on through pipeline 9 to disposal. Resulting cooled UAN solution from UAN cooler 7 flows through pipeline 10 to clay mixer 13. Gelling clay is fed from a source not shown through pipeline 12 to clay mixer 13. The material in clay mixer 13 is stirred with propeller-type agitator 11. A first portion of resulting UAN solution and clay mixture flows from clay mixer 13 through pipeline 14 to pump 15 which pumps the UAN solution therein and clay mixture through pipeline 16 back to clay mixer 13. A second portion of UAN solution and clay mixture flows through pipeline 17 to pump 18 which pumps the UAN solution and clay mixture therein through pipeline 19 to spray tower 20. Fan 21 pulls air through spray tower 20 from pipeline 22. UAN suspension flows from spray tower 20 through pipeline 23 to pump 24 which pumps UAN suspension through pipeline 25 back to spray tower 20. UAN suspension flows from spray tower 20 through pipeline 26 to pump 27 which pumps UAN suspension through pipeline 28 to storage facilities not shown.

Figure 2:
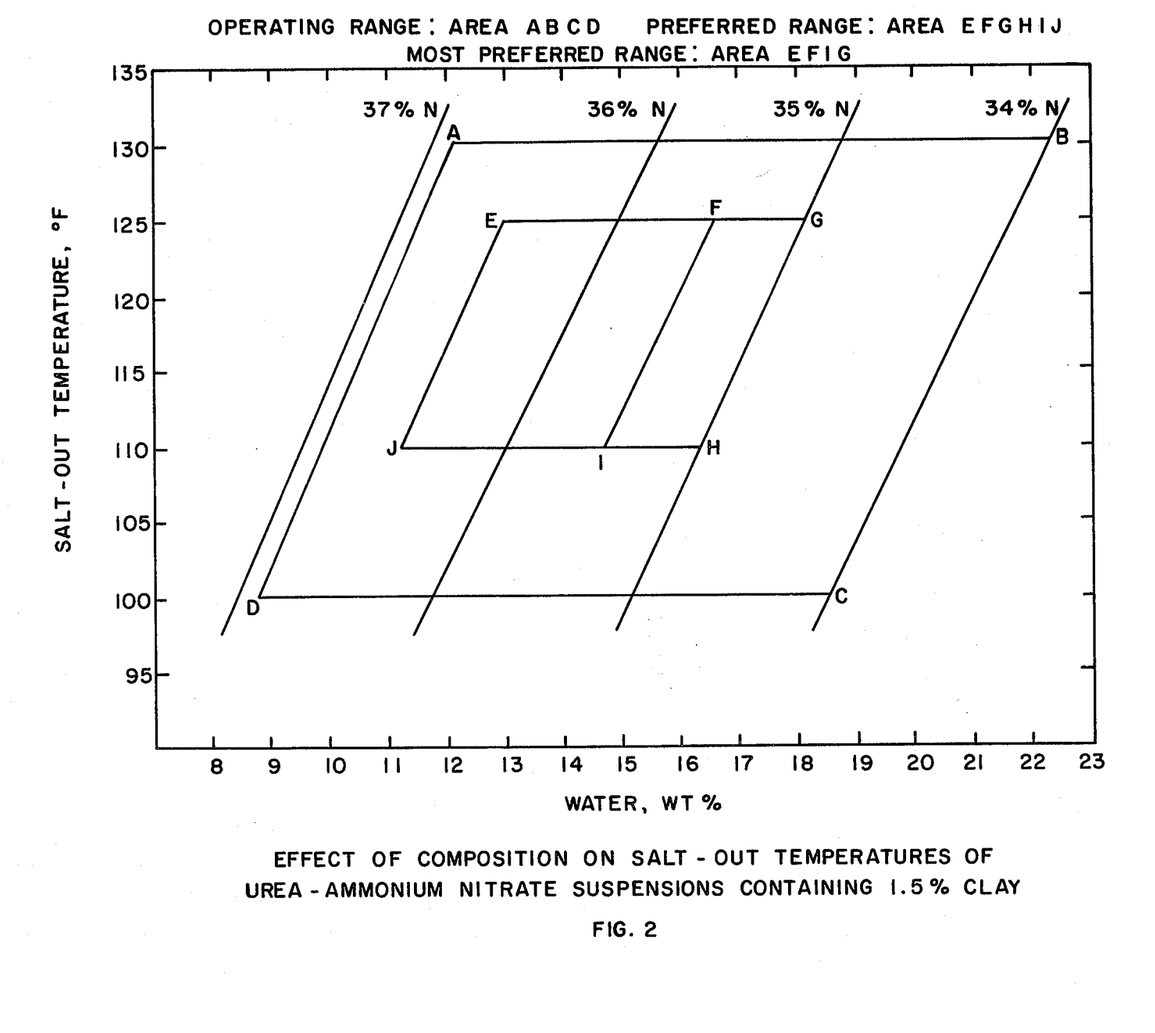
FIG. 2 is a plot which shows the effect of composition on the salt-out temperatures of urea-ammonium nitrate suspensions as well as the operating range, preferred range, and most preferred range of compositions and salt-out temperatures for the urea-ammonium nitrate suspensions.

Referring now more specifically to FIG. 2, a better understanding of this drawing may be obtained from a consideration of the following description of the preferred embodiments, infra.

Figure 3:
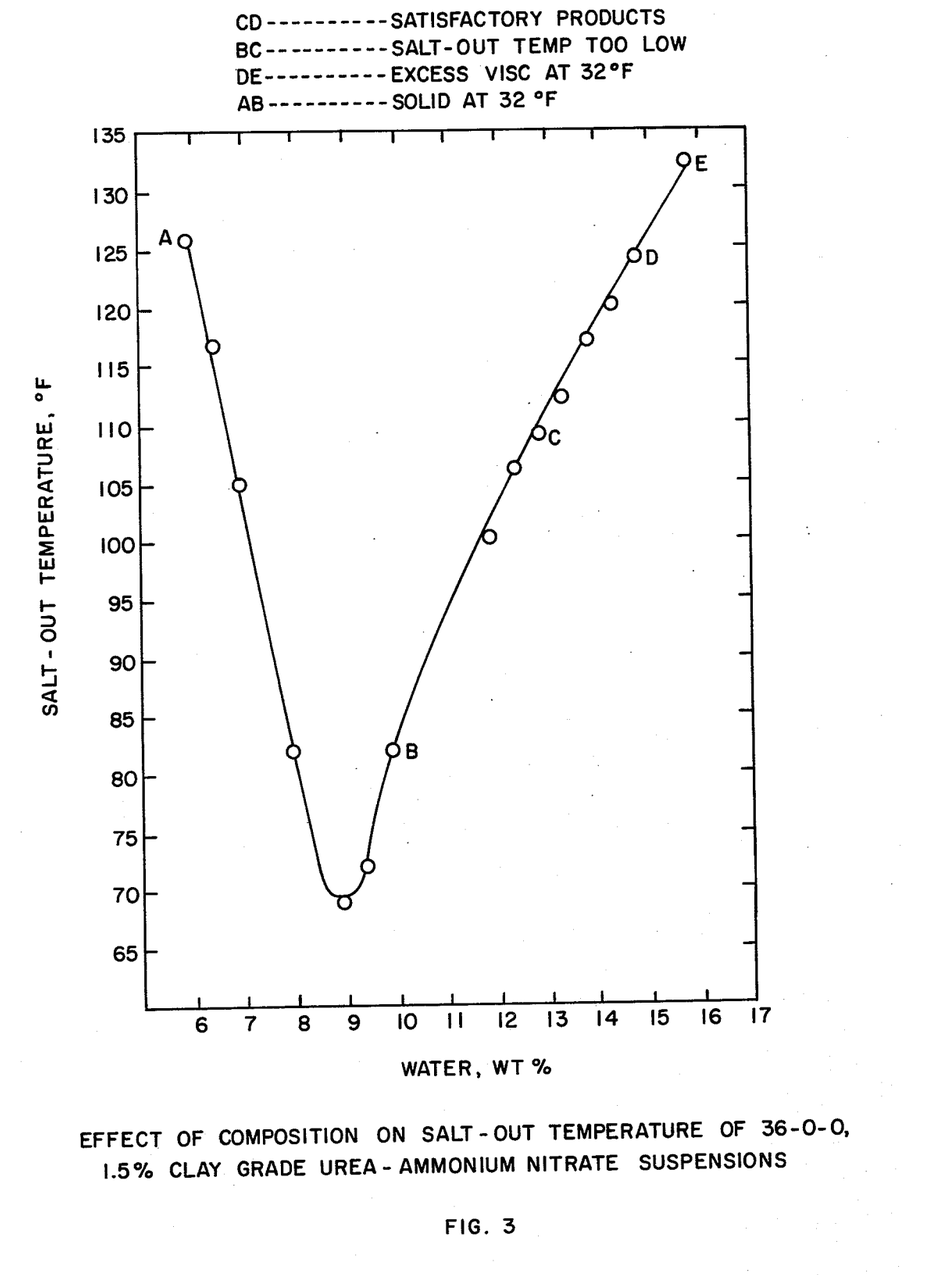
FIG. 3 is a plot showing the effect of composition on the salt-out temperatures of urea-ammonium nitrate suspensions containing 36 percent nitrogen and 1.5 percent clay and also the composition ranges for both satisfactory and unsatisfactory products.

Referring now more specifically to FIG. 3, a better understanding of this drawing may be obtained from a consideration of Example I, infra.

Figure 4:
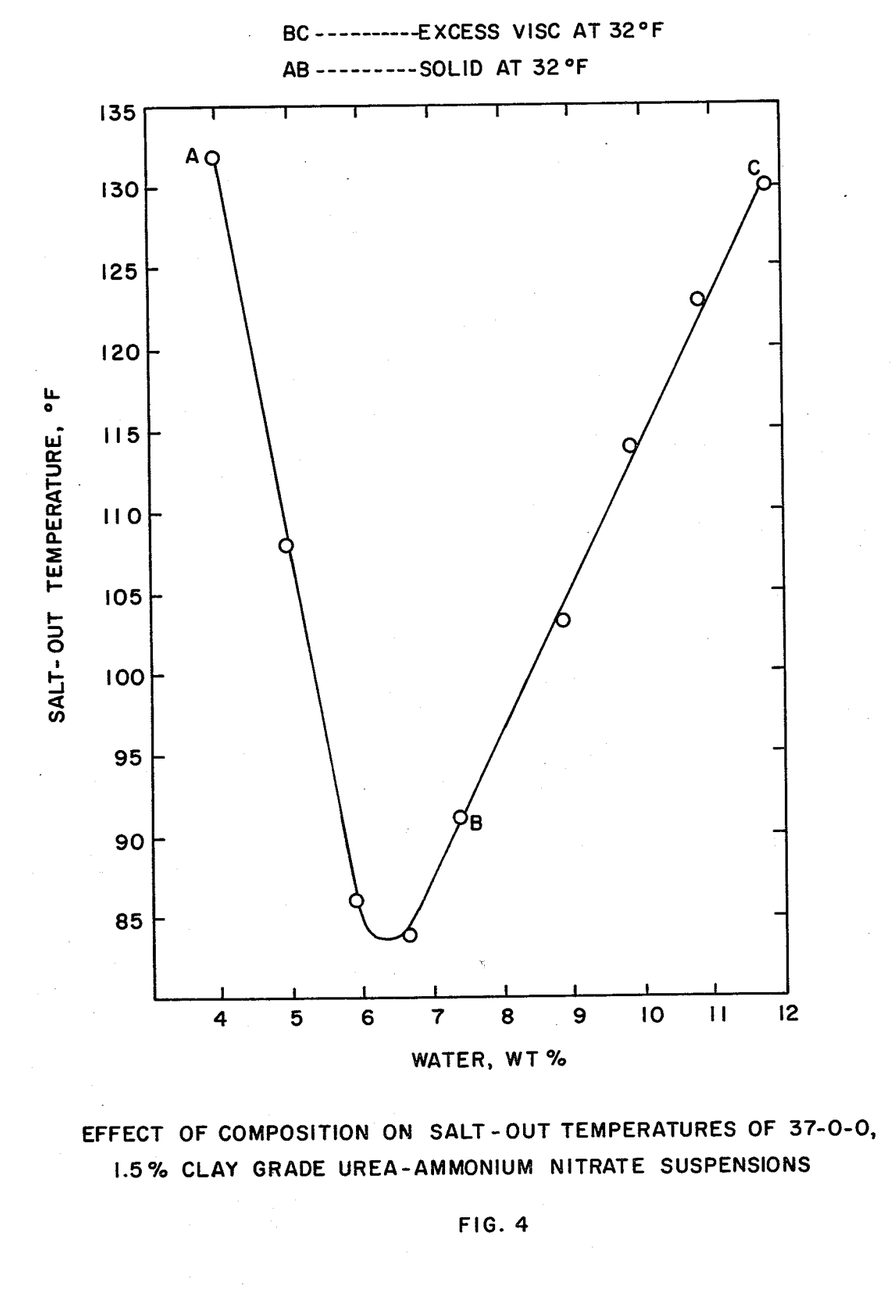
FIG. 4 is a plot showing the effect of composition on the salt-out temperatures of urea-ammonium nitrate suspensions containing 37 percent nitrogen and 1.5 percent clay.

Referring now more specifically to FIG. 4, a better understanding of this drawing may be obtained from a consideration of Example II, infra.

Figure 5:
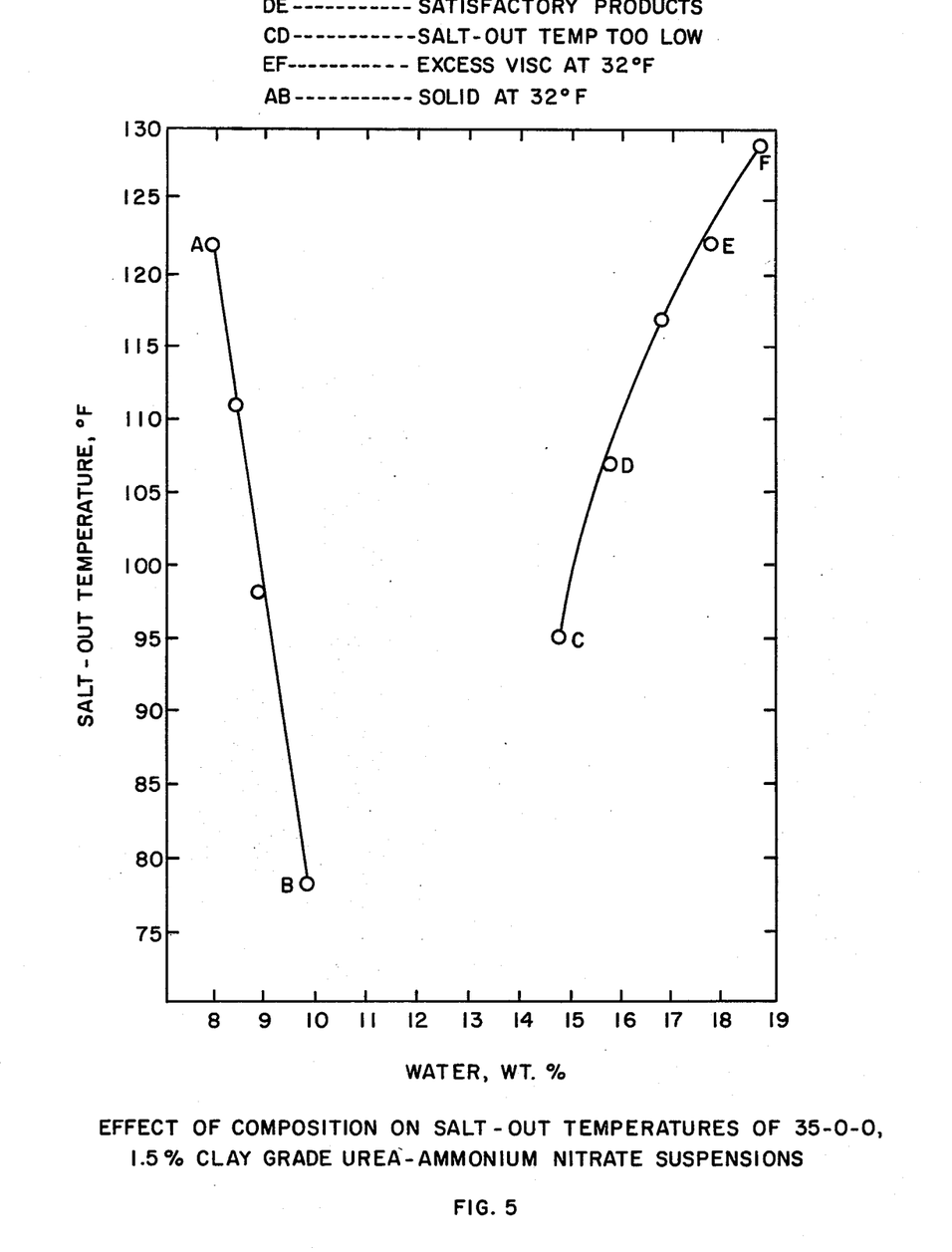
FIG. 5 is a plot showing the effect of composition on the salt-out temperatures of urea-ammonium nitrate suspensions containing 35 percent nitrogen and 1.5 percent clay and also the composition ranges for both satisfactory and unsatisfactory products.

Referring now more specifically to FIG. 5, a better understanding of this drawing may be obtained from a consideration of Example III, infra.

DESCRIPTION OF THE PREFERRED EMBODIMENTS AND FIG. 2

In carrying out the objects of the present invention, we have found that exceptionally high-grade, high-quality urea-ammonium nitrate suspension fertilizers can be produced economically from hot urea and ammonium nitrate solutions, such as the reactor effluents from urea and ammonium nitrate plants, respectively. However, equally high-quality UAN suspensions also can be produced from solid urea, solid ammonium nitrate, and water, or various combinations of solid raw materials and hot solutions; but these methods are more expensive than those using only the two hot solutions. We have unexpectedly found that the composition of the UAN solution in the UAN mixer greatly affects the quality of our product. The composition of the UAN solution in the UAN mixer must be held within a narrow range to produce suspensions with satisfactory storage and handling properties at both high and extremely low temperatures (0° F. and below). As shown in table IV, infra, and FIG. 2, the most preferred composition range of the UAN solution in the UAN mixer (after addition of 1.5 percent by weight clay) is 35.5 to 36.5 percent nitrogen and 16.5 to 11.2 percent water. Before addition of 1.5 percent by weight clay, these percentages of nitrogen and water would be greater by a factor of 1.0152. The most preferred product saturation (salt-out) temperature range is 110° F. to 125° F. As is shown in the following examples, diverging much from these compositions and saturation temperatures results in unsatisfactory products which are either excessively viscous or solid at low temperatures (32° F. and below) or contain large crystals which settle and/or clog pumps and fertilizer application equipment.

The product temperature in the UAN cooler can be varied from about 110° F. to about 150° F. However, we have found that in production of suspensions in the most preferred composition range, the most preferred product temperature range in the UAN cooler is about 125° F. to 140° F.

Gelling clay is added to our product in the clay mixer primarily to distribute homogeneously the solids in the finished product. However, the clay mixer is operated above our products' saturation temperatures, so the material in the clay mixer is a mixture of UAN solution and clay and does not contain any fertilizer solids. The product temperature in the clay mixer can vary from about 110° F. to 150° F. However, in production of suspensions in the most preferred composition range, the most preferred product temperature range in the clay mixer is 125°–140° F. The clay mixer is operated at a retention time, propeller tip speed, and recirculation rate necessary to obtain proper gelling of the clay. These optimum operating conditions for proper gelling of the clay vary according to equipment type and configuration and must be determined experimentally for a specific set of equipment. We have found that the clay concentration can be varied widely, but the most preferred concentration is 1.5 percent by weight in the finished products. Lower concentrations may result in syneresis (clear layer) and settling of crystals in the products. One and one-half percent clay results in products with excellent physical properties, while increasing the clay concentration above 1.5 percent does not further improve the products; it increases production costs, unnecessarily dilutes the products, and may cause excessively high viscosities.

Addition of gelling clay to our product when it is in an all-solution state before precipitation of solids occurs is the most preferred order of clay addition. In other words, it is most preferred to add the clay when the product is somewhat above its salt-out temperature so that no crystallization of fertilizer salts occurs before the product is fed to the spray tower. There are several reasons for this: (1) it inhibits scale formation and buildup of the crystallizing phase on the inside surfaces of the spray tower and the lines leading to and from the spray tower which would otherwise eventually lead to clogging of the pipelines and pumps causing shutdown of the process; and (2) the presence of clay in the product in the spray tower keeps the solid and liquid phases homoneneously distributed, preventing clogging of pumps and pipelines on the spray tower.

With the preferred composition range (35.5–36.5 percent N, 16.5–11.2 percent H2O, 1.5 percent clay), the effluent solution, clay mixture from the clay mixer, is cooled quickly in the spray tower to 100° to 115° F. Product temperatures higher than about 115° F. in the spray tower result in insufficient nucleation, whereas, temperatures lower than about 100° F. provide sufficient nucleation but significantly increase the air requirement for the spray tower, thereby increasing the cost of cooling the products. In addition, the average size of resulting crystals may be so small as to cause excessive viscosities in the products. Both quick-cooling and rapid dispersion of the product in the spray tower are necessary to obtain sufficient crystal nucleation. Slow cooling results in growth of crystals to large sizes. Recirculation or other means of vigorous agitation can be used to control crystal size. Control of crystal size is important since excessively large crystals may settle to the bottom of containers during storage or shipment and clog spray nozzles during application of the product to the soil. Crystals which are too small cause excessive viscosities which hamper or prevent transfer of the material from storage or shipping tanks and application of the product to the soil. We have unexpectedly found that during cooling of the products through their salt-out temperatures, which results in crystallization, the products must contain gelling clay and the products must be cooled with air to prevent scale formation. Either a spray-type cooler, as in FIG. 1, supra, or an air-sparged vessel may be used. Other methods utilizing solid cooling surfaces result in nucleation and growth of product crystals on the cooling surfaces. This scale formation rapidly increases in thickness and insulates the heat transfer surface, preventing cooling of the product to a temperature necessary for sufficient nucleation of crystals; thus, satisfactory products cannot be made.

EXAMPLES

In order that those skilled in the art may better understand how the present invention may be practiced for production of highly concentrated, high-quality urea-ammonium nitrate suspensions, the following examples are given by way of illustration only and not necessarily by way of limitation. Example I, infra, identifies the optimum composition range for satisfactory urea-ammonium nitrate suspensions containing 36 percent nitrogen and 1.5 percent clay. Example II, infra, shows the effect of varying the composition on the physical properties of UAN suspensions containing 37 percent nitrogen and 1.5 percent clay and shows that there is no satisfactory composition range for 37-0-0, 1.5 percent clay, grade UAN suspensions. Example III, infra, identifies the optimum composition range for satisfactory UAN suspensions containing 35 percent nitrogen and 1.5 percent clay.

EXAMPLE I AND FIG. 3

A study was made of the effect of varying the composition on the physical properties of urea-ammonium nitrate suspensions containing 36 percent nitrogen and 1.5 percent by weight attapulgite suspending clay in an effort to determine the optimum composition range. The saturation, or salt-out, temperature was used as an evaluation parameter, because it gives a relative indication of the proportion of solids present in the suspensions at a given temperature; the proportion of solids at a given temperature increases with increase in salt-out temperature (the temperature at which precipitation of solids begins). The proportion of solids in a suspension can affect physical properties such as viscosity, pourability, and crystal size. For example, in comparing two products with the same crystal type and size, the product containing more solids has a higher viscosity and perhaps a lower pourability because it contains a greater number of crystals. A suspension's salt-out temperature obviously should be sufficiently higher than room temperature to prevent dissolution of most or all of the crystals during warm weather storage and then formation of large crystals during the slow cooling which occurs when the weather again becomes cooler. Also, the salt-out temperature must be high enough to allow sufficient nucleation of crystals by conventional, economical cooling methods. If the salt-out temperature of the product is not sufficiently above the temperature at which a cooler can be operated using air at ambient temperatures, inadequate nucleation of crystals in the cooler will result in a finished product containing only a few crystals of very large size which settle and/or clog pumps and fertilizer application equipment. On the other hand, very high salt-out temperatures result in suspensions with excessively high viscosities.

A satisfactory base suspension fertilizer must have viscosities of less than 1000 and 1500 centipoises at 80° F. and 32° F., respectively. Also, the products must be at least 98 percent pourable by volume at both 80° F. and 32° F. If a suspension fails to meet any one of these criteria, field tests show that, in most cases, it is unsatisfactory for commercial use.

The results in Table I below show the effect of composition on the salt-out temperature, viscosity, and pourability of 36-0-0, 1.5 percent clay urea-ammonium nitrate suspensions.

TABLE I

Effects of Urea,[a] Ammonium Nitrate,[b] and Water Concentrations on Salt-Out Temperature, Viscosity, and Pourability of 36-0-0, 1.5% Clay,[c] Urea-Ammonium Nitrate Suspension

| Test No. | Composition, wt % | | | | Salt-Out temp, °F. | Viscosity,[d] cP | | Pourability,[e] vol % | |
|---|---|---|---|---|---|---|---|---|---|
| | H2O | Urea | NH4NO3 | Clay | | at 80° F. | at 32° F. | at 80° F. | at 32° F. |
| 28 | 3.94 | 25.49 | 69.07 | 1.5 | 169 | >2000 | Solid | 0 | 0 |
| 30 | 5.91 | 31.54 | 61.05 | 1.5 | 126 | 650 | Solid | 0 | 0 |
| 35 | 6.40 | 33.06 | 59.04 | 1.5 | 117 | 450 | Solid | 100 | 0 |
| 34 | 6.90 | 34.56 | 57.04 | 1.5 | 105 | 200 | Solid | 100 | 0 |
| 31 | 7.88 | 37.59 | 53.03 | 1.5 | 82 | 50 | Solid | 100 | 0 |
| 33 | 8.87 | 40.61 | 49.02 | 1.5 | 69 | 50 | Solid | 100 | 0 |
| 36 | 9.36 | 42.13 | 47.01 | 1.5 | 72 | 50 | Solid | 100 | 0 |
| 32 | 9.85 | 43.64 | 45.01 | 1.5 | 82 | 50 | 900 | 100 | 0 |

TABLE I-continued

Effects of Urea,[a] Ammonium Nitrate,[b] and Water Concentrations
on Salt-Out Temperature, Viscosity, and Pourability
of 36-0-0, 1.5% Clay,[c] Urea-Ammonium Nitrate Suspension

| Test No. | Composition, wt % | | | | Salt-Out temp., °F. | Viscosity,[d] cP | | Pourability,[e] vol % | |
|---|---|---|---|---|---|---|---|---|---|
| | $H_2O$ | Urea | $NH_4NO_3$ | Clay | | at 80° F. | at 32° F. | at 80° F. | at 32° F. |
| 26 | 11.82 | 49.68 | 37.00 | 1.5 | 100 | 200 | 750 | 100 | 100 |
| 22 | 12.31 | 51.20 | 34.99 | 1.5 | 106 | 200 | 500 | 100 | 100 |
| 15 | 12.81 | 52.71 | 32.98 | 1.5 | 109 | 200 | 550 | 100 | 100 |
| 37 | 13.30 | 54.21 | 30.99 | 1.5 | 112 | 400 | 750 | 100 | 100 |
| 14 | 13.79 | 55.73 | 28.98 | 1.5 | 117 | 400 | 800 | 100 | 100 |
| 38 | 14.28 | 57.25 | 26.97 | 1.5 | 120 | 550 | 1200 | 100 | 99 |
| 21 | 14.78 | 58.76 | 24.96 | 1.5 | 124 | 500 | 1400 | 100 | 98 |
| 27 | 15.76 | 61.78 | 20.96 | 1.5 | 132 | 1050 | >2000 | 99 | 0 |
| 5 | 12.74 | 54.01 | 31.25 | 2.0 | 115 | 650 | 1500 | 100 | 100 |

[a] Produced by Vistron Corporation, Lima, Ohio; 46.4% N, 0.2% biuret, 0.06% $H_2O$.
[b] Reagent-grade ammonium nitrate, 35% N.
[c] Min-U-Gel 200 (Floridin Company, 3400 Peachtree Road, Atlanta, Georgia).
[d] Viscosity measured with a Brookfield viscometer (Model LVT) with spindle No. 3 rotated at 60 r/min. Suspensions mixed for 5 minutes at a propeller tip speed of about 7 ft/s before measurements were made.
[e] Mild agitation supplied by gently rotating a stirring rod twice around inside of container before measurements were made.

Referring now more specifically to Table I above, it may be seen that to maintain 36 percent nitrogen in all tests, increasing the water content required a corresponding increase in urea content and decrease in ammonium nitrate content. With increase in water content, the salt-out temperature decreased from 169° F. in the product containing 3.94 percent water (test No. 28) to a minimum of 69° F. in the product containing 8.87 percent water (test No. 33). With further increase in water content to 15.76 percent, the salt-out temperature rose to 132° F. The results show that there is a definite relationship between the salt-out temperature and the viscosity; with increase in water content, the viscosity at 80° F. decreased to a minimum and then rose again similar to the way in which the salt-out temperature behaved. This is because in products with about the same crystal size, the viscosity varies directly with the solids content, and the solids content varies directly with the salt-out temperature. For example, products with higher salt-out temperatures (test Nos. 27 and 28) have higher viscosities because they contain a higher proportion of solids. The viscosity at 32° F. decreased to a minimum and then rose again, but the minimum viscosity did not coincide with the minimum salt-out temperature. This is because with the low water contents (11.82 and 9.85 percent) in test Nos. 26 and 32, the presence of ammonium nitrate solids caused the voscosities at 32° F. to be higher than expected. All products containing less than 9.85 percent water were solid at 32° F. The data show that the satisfactory 36-0-0-1.5 clay products contained from 11.82 to 14.78 percent water. However, salt-out temperatures much less than about 110° F. are too low to allow sufficient nucleation of crystals by conventional, economical cooling methods. Also, such low salt-out temperatures might lead to dissolution of most or all of the crystals during warm weather storage and then formation of large crystals when the weather becomes cooler. FIG. 3 shows the effect of composition on the salt-out temperatures of 36-0-0, 1.5 percent clay urea-ammonium nitrate suspensions. These data show that the optimum composition range consists of the portion of the curve between and including points C and D; this corresponds to water contents ranging from 12.81 to 14.78 percent and to urea and ammonium nitrate contents ranging from 52.71 to 58.76 percent and 32.98 to 24.96 percent, respectively. Products containing from 5.91 to 9.36 percent water (point A to point B) were solid at 32° F. Although products containing 9.85 to 12.31 percent water (point B to point C) had satisfactory viscosities at 32° F., their salt-out temperatures were too low to obtain sufficient nucleation of crystals by conventional, economical cooling methods, or too low to prevent dissolving of most of the crystals during hot weather. More than 14.78 percent water (point D to point E, FIG. 3) resulted in suspension with excessive viscosity at 32° F.

Referring again to Table I above, the clay content was increased from 1.5 percent in test No. 15 to 2.0 percent in test No. 5 with water content before addition of clay held constant at 13.00 percent; this caused a significant increase in both the salt-out temperature and viscosity. The product in test No. 5 had a higher salt-out temperature than the product in test No. 15 because a higher urea-to-ammonium nitrate ratio was required to compensate for dilution by the extra clay and thus to maintain 36 percent nitrogen. The higher viscosity in test No. 5 was caused partly by a higher solids content and partly by the higher clay content. Because the viscosity of the product in test No. 5 was at the limit at 32° F. (1500 cP), increasing the clay content to 2.0 percent narrows the salt-out temperature range (and thus the composition range) for satisfactory 36-0-0-2.0 clay products to 110°–115° F. instead of 110°–124° F. for 36-0-0, 1.5 percent clay, products.

EXAMPLE II AND FIG. 4

A study was made of the effect of varying the composition on the physical properties of urea-ammonium nitrate suspensions containing 37 percent nitrogen and 1.5 percent by weight attapulgite suspending clay in an effort to determine the optimum composition range.

As shown in Table II below and in FIG. 4, no satisfactory composition range exists for 37-0-0, 1.5 percent clay, products. Although viscosities and pourabilities were generally satisfactory at 80° F., all products were unsatisfactory because they were not pourable at 32° F. and were either solid or excessively viscous at 32° F. Since good fluidity at 32° F. and below is a necessary requirement for commercial base suspension fertilizers, production of UAN suspensions containing 37 percent or more nitrogen is not considered to be feasible.

TABLE II

Effects of Urea,[a] Ammonium Nitrate,[b] and Water Concentration on Salt-Out Temperature, Viscosity, and Pourability of 37-0-0, 1.5% Clay,[c] Urea-Ammonium Nitrate Suspension

| Test No. | Composition, wt % | | | | Sale-Out temp, °F. | Viscosity,[d] cP | | Pourability,[e] vol % | |
|---|---|---|---|---|---|---|---|---|---|
| | $H_2O$ | Urea | $NH_4NO_3$ | Clay | | at 80° F. | at 32° F. | at 80° F. | at 32° F. |
| 20 | 3.94 | 34.16 | 60.40 | 1.5 | 132 | 1700 | Solid | 0 | 0 |
| 24 | 4.93 | 37.18 | 56.39 | 1.5 | 108 | 400 | Solid | 0 | 0 |
| 23 | 5.91 | 40.21 | 52.38 | 1.5 | 86 | 100 | Solid | 100 | 0 |
| 29 | 6.65 | 42.47 | 49.38 | 1.5 | 84 | 50 | Solid | 100 | 0 |
| 25 | 7.39 | 44.75 | 46.36 | 1.5 | 91 | 100 | Solid | 100 | 0 |
| 18 | 8.87 | 49.28 | 40.35 | 1.5 | 103 | 150 | >2000 | 100 | 0 |
| 13 | 9.85 | 52.30 | 36.35 | 1.5 | 114 | 250 | >2000 | 100 | 0 |
| 12 | 10.84 | 55.33 | 32.33 | 1.5 | 123 | 450 | >2000 | 100 | 0 |
| 11 | 11.82 | 58.35 | 28.33 | 1.5 | 130 | 700 | >2000 | 100 | 0 |

[a]Produced by Vistron Corporation, Lima, Ohio; 46.4% N, 0.2% biuret, 0.06% $H_2O$.
[b]Reagent-grade ammonium nitrate, 35% N.
[c]Min-U-Gel 200 (Floridin Company, 3400 Peachtree Road, Atlanta, Georgia).
[d]Viscosity measured with a Brookfield viscometer (Model LVT) with spindle No. 3 rotated at 60 r/min. Suspensions mixed for 5 minutes at a propeller tip speed of about 7 ft/s before measurements were made.
[e]Mild agitation supplied by gently rotating a stirring rod twice around inside of container before measurements were made.

EXAMPLE III AND FIG. 5

A study was made of the effect of varying the composition on the physical properties of urea-ammonium nitrate suspensions containing 35 percent nitrogen and 1.5 percent by weight attapulgite suspending clay in an effort to determine the optimum composition range. Referring to Table III, below, and FIG. 5, the satisfactory 35-0-0, 1.5 percent clay, products contained 15.76 to 17.73 percent water (point D to point E, FIG. 5), 52.98 to 59.03 percent urea, and 29.76 to 21.74 percent ammonium nitrate and had salt-out temperatures ranging from about 107° F. to 122° F. These results show that the allowable variations in composition for satisfactory products are about equal in magnitude for both 35-0-0 and 36-0-0, 1.5 percent clay, products. The viscosities of the satisfactory 35-0-0, 1.5 percent clay, products ranged from about 200 to 600 centipoises at 80° F. and 500 to 1500 centipoises at 32° F., and these are about the same values as were obtained for satisfactory 36-0-0, 1.5 percent clay, products.

clay, the range of operating conditions as well as the preferred ranges of conditions and variables for carrying out our process are summarized in Table IV below and in FIG. 2, and the composition and salt-out temperature ranges are described by the following equations:

$U \equiv$ WT% UREA $A \equiv$ WT% AMMONIUM NITRATE $W \equiv$ WT% WATER $C \equiv$ WT% CLAY = 1.5 (CONSTANT)

$N \equiv$ WT% TOTAL NITROGEN $T \equiv$ SALT-OUT TEMPERATURE, °F.

$$W = 0.117286T - 3.39144N + 122.137 \quad (1)$$

$$8.7 \leq W \leq 22.2 \quad (2)$$

$$100 \leq T \leq 130 \quad (3)$$

TABLE III

Effects of Urea,[a] Ammonium Nitrate,[b] and Water Concentration on Salt-Out Temperature, Viscosity, and Pourability of 35-0-0, 1.5% Clay,[c] Urea-Ammonium Nitrate Suspension

| Test No. | Composition, wt % | | | | Salt-Out temp, °F. | Viscosity,[d] cP | | Pourability,[e] vol % | |
|---|---|---|---|---|---|---|---|---|---|
| | $H_2O$ | Urea | $NH_4NO_3$ | Clay | | at 80° F. | at 32° F. | at 80° F. | at 32° F. |
| 50 | 7.88 | 28.79 | 61.83 | 1.5 | 122 | 500 | Solid | 100 | 0 |
| 50A | 8.37 | 30.31 | 59.82 | 1.5 | 111 | 350 | Solid | 100 | 0 |
| 51 | 8.87 | 31.82 | 57.81 | 1.5 | 98 | 100 | Solid | 100 | 0 |
| 52 | 9.85 | 34.84 | 53.81 | 1.5 | 78 | 50 | Solid | 100 | 0 |
| 53 | 14.78 | 49.96 | 33.76 | 1.5 | 95 | 50 | 250 | 100 | 100 |
| 49 | 15.76 | 52.98 | 29.76 | 1.5 | 107 | 200 | 500 | 100 | 100 |
| 48 | 16.75 | 56.01 | 25.74 | 1.5 | 117 | 400 | 750 | 100 | 100 |
| 46 | 17.73 | 59.03 | 21.74 | 1.5 | 122 | 600 | 1500 | 100 | 100 |
| 47 | 18.72 | 62.06 | 17.72 | 1.5 | 129 | 950 | >2000 | 98 | 0 |

[a]Produced by Vistron Corporation, Lima, Ohio; 46.4% N, 0.2% biuret, 0.06% $H_2O$.
[b]Reagent-grade ammonium nitrate, 35% N.
[c]Min-U-Gel 200 (Floridin Company, 3400 Peachtree Road, Atlanta, Georgia).
[d]Viscosity measured with a Brookfield viscometer (Model LVT) with spindle No. 3 rotated at 60 r/min. Suspensions mixed for 5 minutes at propeller tip speed of about 7 ft/s before measurements were made.
[e]Mild agitation supplied by gently rotating a stirring rod twice around inside of container before measurements were made.

INVENTION PARAMETERS

After sifting and winnowing through the data above as well as other data and results, together with operating characteristics of our novel and unique processes for producing urea-ammonium nitrate suspension fertilizers from urea, ammonium nitrate, water, and attapulgite $$34.0 \leq N \leq 36.9 \quad (4)$$

Choosing values within the specified ranges for any two of the three variables N, W, and T specifies the value of the third variable according to equation (1). Then the values for U and A can be determined by the following equations:

$$U = 8.77192N + 3.07018W - 302.412 \quad (5)$$

$$A = 100 - U - W - C, \text{ where } C = 1.5 \quad (6)$$

Equations (1), (2), (3), and (4) describe area ABCD in FIG. 2. FIG. 2 is actually a compilation of portions of the data from tables I, II, and III and FIGS. 2, 3, and 4 into a single figure. Equation (1) was determined by performing a multiple linear regression analysis using SAS (Statistical Analysis Systems) computer programs. This is similar to performing a linear regression or least squares fit on two-variable data to determine the equation of a line which best fits the data points. However, the multiple linear regression used in our work determines the equation of the surface which best fits the three-variable (N, T, and W) data points. Equation (1) was obtained by performing the multiple linear regression on the three variables N, T, and W from tables I, II, and III. The data points used for the multiple linear regression from table I were the values for N, T, and W in test nos. 26, 22, 15, 37, 14, 38, 21, and 27. From table II, test nos. 25, 18, 13, 12, and 11 were used, and from table III, test nos. 53, 49, 48, 46, and 47 were used.

Equation (1), therefore, describes a surface in three dimensional space consisting of the coordinates N, T, and W. Equations (2), (3), and (4) describe the limits of each variable and therefore the boundaries of the surface described by equation (1). This surface, transposed on the T-W plane, appears in FIG. 2 as area ABCD. Therefore, equations (1), (2), (3), and (4) describe area ABCD in FIG. 2, which is the operating range for the variables N, T, and W. By choosing any two of these three variables, the third may be determined graphically or by using equation (1), as long as the two chosen values are within the ranges specified by equations (2), (3), and (4). The correlation coefficient for equation (1) is 0.9964, which indicates that the equation closely fits the data points. In other words, equation (1) describes area ABCD in FIG. 2 with a high degree of accuracy.

By choosing or determining values for N and W using equation (1), the total composition of a urea-ammonium nitrate suspension containing 1.5 percent by weight of clay can be determined using equations (5) and (6). Equations (5) and (6) were derived from basic material balance equations as follows:

Balance on Total $$U + A + W + C = 100 \quad C = 1.5 \text{ (constant)} \quad (7)$$

$$\therefore U = 98.5 - A - W \quad (8)$$

Balance on Nitrogen

The urea used in our work contained 46.4 percent nitrogen and the ammonium nitrate, which was reagent grade, contained 35 percent nitrogen.

$$\therefore 0.464U + 0.35A = N \quad (9)$$

$$0.35A = N - 0.464U$$

$$A = 2.85714N - 1.32571U \quad (10)$$

Substituting equation (10) in equation (8), we have:

$$U = 98.5 - 2.85714N + 1.32571U - W \quad (11)$$

$$-0.32571U = 98.5 - 2.85714N - W$$

$$U = 8.77192N + 3.07018W - 302.412 \quad (5)$$

Then, equation (7), the material balance on the total, can be solved for A to get equation (6):

$$A = 100 - U - W - C \quad C = 1.5$$

Since U, W, and C are known, this equation can be solved to determine the weight percent ammonium nitrate, A.

To determine the least cost composition for a urea-ammonium nitrate suspension, one may simply choose values for N and T in equation (1) so as to minimize either U or A in equations (5) and (6), depending on which nitrogen source is more expensive on a cost per unit of nitrogen basis. The cost per unit of nitrogen for urea and ammonium nitrate may be determined in the following manner:

UREA $$\frac{\text{cost}}{\text{ton N}} = \frac{\text{cost}}{\text{ton urea}} \times \frac{1 \text{ ton urea}}{\text{weight fraction N in urea}}$$

For example, if the urea to be used contains 46 percent nitrogen, the equation would be:

$$\frac{\text{cost}}{\text{ton N}} = \frac{\text{cost}}{\text{ton urea}} \times \frac{1 \text{ ton urea}}{0.46}, \text{ or}$$

cost per ton of nitrogen = 2.174 × cost per ton of urea.

AMMONIUM NITRATE

Likewise, if the ammonium nitrate to be used contains 35 percent nitrogen, the equation would be $$\frac{\text{cost}}{\text{ton N}} = \frac{\text{cost}}{\text{ton ammonium nitrate}} \times \frac{1 \text{ ton ammonium nitrate}}{0.35}, \text{ or}$$

cost per ton of nitrogen = 2.857 × cost per ton of ammonium nitrate. Thus, to determine the least cost composition, the ratio of urea to ammonium nitrate, U/A should be maximized if the nitrogen in the urea is found to be cheaper than the nitrogen in ammonium nitrate, and U/A should be minimized if the nitrogen in urea is found to be more expensive. The ratio U/A may be determined as follows:

$$U + A + W + C = 100 \quad C = 1.5, \text{ constant} \quad (7)$$

solving for A, $$A = 98.5 - U - W \quad (12)$$

$$U = (U/A)A$$

$$\therefore A = 98.5 - (U/A)A - W \quad (13)$$

$$A + (U/A)A = 98.5 - W$$

$$A(1 + U/A) = 98.5 - W$$

$$A = \frac{98.5 - W}{1 + U/A} \quad (14)$$

-continued $$0.464U + 0.35A = N \text{ (balance on nitrogen)} \quad (9)$$

$$0.464(U/A)A + 0.35A = N$$

$$A(0.464U/A + 0.35) = N$$

$$A = \frac{N}{0.464U/A + 0.35} \quad (15)$$

Using equations (14) and (15):

$$\frac{98.5 - W}{1 + U/A} = \frac{N}{0.464U/A + 0.35} \quad (16)$$

$$(0.464U/A + 0.35)(98.5 - W) = N(1 + U/A)$$

$$45.704U/A - 0.464(U/A)W + 34.475 - 0.35W = N + N(U/A)$$

$$U/A(45.704 - 0.464W - N) = N + 0.35W - 34.475$$

$$U/A = \frac{N + 0.35W - 34.475}{45.704 - 0.464W - N} \quad (17)$$

In a similar way, equation (16) may be solved for W to obtain:

$$W = \frac{U/A(45.704 - N) + 34.475 - N}{0.464U/A + 0.35} \quad (18)$$

Then using equations (1) and (18):

$$\frac{U/A(45.704 - N) + 34.475 - N}{0.464U/A + 0.35} =$$

$$122.1367 - 3.39144N + 0.117286T$$

After rearranging and solving for U/A, one obtains:

$$U/A = \frac{0.187N - 0.04105T - 8.2728}{0.054421T - 0.57363N + 10.9674} \quad (19)$$

Equation (19) expresses U/A as a function of N and T and is useful for comparison of values of U/A for various compositions in determining the least cost mixture. Although it is not clearly evident from a simple examination of equation (19), substitution of a few values for N and T in this equation shows that U/A increases with increase in salt-out temperature and with decrease in nitrogen content. Therefore, if the nitrogen in the urea is found to be cheaper, one should maximize U/A and thus choose a product with a high salt-out temperature and low nitrogen content. However, in such a case, the higher shipping cost per unit of nitrogen for a suspension with low nitrogen content should be considered, where applicable.

TABLE IV

Acceptable and Preferred Ranges for Production of Urea-Ammonium Nitrate Suspension Fertilizer

| | Operating Range | Preferred Range | Most Preferred Range or Value |
|---|---|---|---|
| UAN mixer | | | |
| Nitrogen, wt %[a] | 34.0–36.9 | 35.0–36.5 | 35.5–36.5 |
| Water, wt %[a] | 22.2–8.7 | 18.1–11.2 | 16.5–11.2 |
| Saturation temp. °F. | 100–130 | 110–125 | 110–125 |
| Temp. °F. | 115–250 | 125–240 | 130–230 |
| Cooling procedure | Clay addition prior to or during nucleation of product | Two-stage cooling with clay addition prior to nucleation | Two-stage cooling with air cooling used to cool product in second-stage |

TABLE IV-continued

Acceptable and Preferred Ranges for Production of Urea-Ammonium Nitrate Suspension Fertilizer

| | Operating Range | Preferred Range | Most Preferred Range or Value |
|---|---|---|---|
| | crystals | of product crystals | cooler and with clay addition prior to nucleation of product crystals |
| UAN cooler Temp. °F. | 110–150 | 120–145 | 125–140 |
| Clay mixer Temp. °F. | 110–150 | 120–145 | 125–140 |
| Clay, wt % | 1.0–3.0 | 1.3–2.0 | 1.5 |
| Spray tower Temp. °F. | 90–125 | 95–120 | 100–115 |

[a]Values listed are weight percentages in the product after addition of 1.5% by weight of clay in the clay mixer. Since no clay is present in the UAN mixer, the actual percentages in the UAN mixer would be greater by a factor of 1.0152. To obtain the weight percent urea in a product containing 1.5% by weight of clay, the following equation may be used: wt % urea = 8.77192 (wt % nitrogen) + 3.07018 (wt % water) − 302.412. Then to obtain the weight percent ammonium nitrate, the following equation is used: wt % ammonium nitrate = 100% − wt % urea − wt % water − 1.5% clay.

While we have shown and described particular embodiments of our invention, modifications and variations thereof will occur to those skilled in the art. We wish it to be understood therefore that the appended claims are intended to cover such modifications and variations which are within the true scope and spirit of our invention.

What we claim as new and desire to secure by Letters Patent of the United States is:

1. As a new composition of matter a fertilizer suspension containing urea, ammonium nitrate, water, and gelling agent, said suspension having (A) a solid phase consisting of urea and a liquid phase, said liquid phase having a density ranging from less than to substantially equal to that of said solid phase, and (B) said suspension defined within the area ABCD of FIG. 2.

2. The composition of claim 1 wherein said suspension is defined by the area EFGHIJ of FIG. 2.

3. The composition of claim 1 wherein said suspension is defined by the area EFIJ of FIG. 2.

4. As a new composition of matter a fertilizer suspension containing urea, ammonium nitrate, water, and gelling agent, said suspension having (A) a solid phase consisting of urea and a liquid phase, said liquid phase having a density ranging from less than to substantially equal to that of said solid phase, and (B) said suspension defined according to the following equation:

$$W = 0.117286T - 3.39144N + 122.137$$

$$8.7 \leq W \leq 22.2$$

$$100 \leq T \leq 130$$

$$34.0 \leq N \leq 36.9$$

in which
U≡wt% urea
A≡wt% ammonium nitrate
W≡wt% water
C≡wt% clay=1.5 (constant)
N≡wt% total nitrogen
T≡salt-out temperature, °F.

5. The composition of claim 4 wherein the parameters for weight percent water, °F. salt-out temperature, and weight percent total nitrogen are as follows:

$$11.2 \leq W \leq 18.1$$

$$110 \leq T \leq 125$$

$$35.0 \leq N \leq 36.5$$

6. The composition of claim 4 wherein the parameters for weight percent water, °F. salt-out temperature, and weight percent total nitrogen are as follows:

$$11.2 \leq W \leq 16.5$$

$$110 \leq T \leq 125$$

$$35.5 \leq N \leq 36.5$$

7. A method of determining the least cost mixture of the composition of claim 4 which comprises the steps of
   (a) optimizing the value U/A in the following equation:

$$U/A = \frac{0.187N - 0.04105T - 8.2728}{0.054421T - 0.57363N + 10.9674} \quad -(1)$$

$$34.0 \leq N \leq 36.9$$

$$100 \leq T \leq 130$$

(b) substituting the optimum values for N and T from equation (1) above into equation (2) below to determine the weight percent water $$W = 0.117286T - 3.39144N + 122.137 \quad (2)$$

(c) substituting W from equation (2) above and N from equation (1) above to solve for percent urea and percent ammonium nitrate, respectively, $$U = 8.77192N + 3.07018W - 302.412$$

$$A = 100 - U - W - C, \text{ where } C = 1.5. \quad (3)$$

* * * * *